United States Patent Office 3,176,143
Patented Mar. 30, 1965

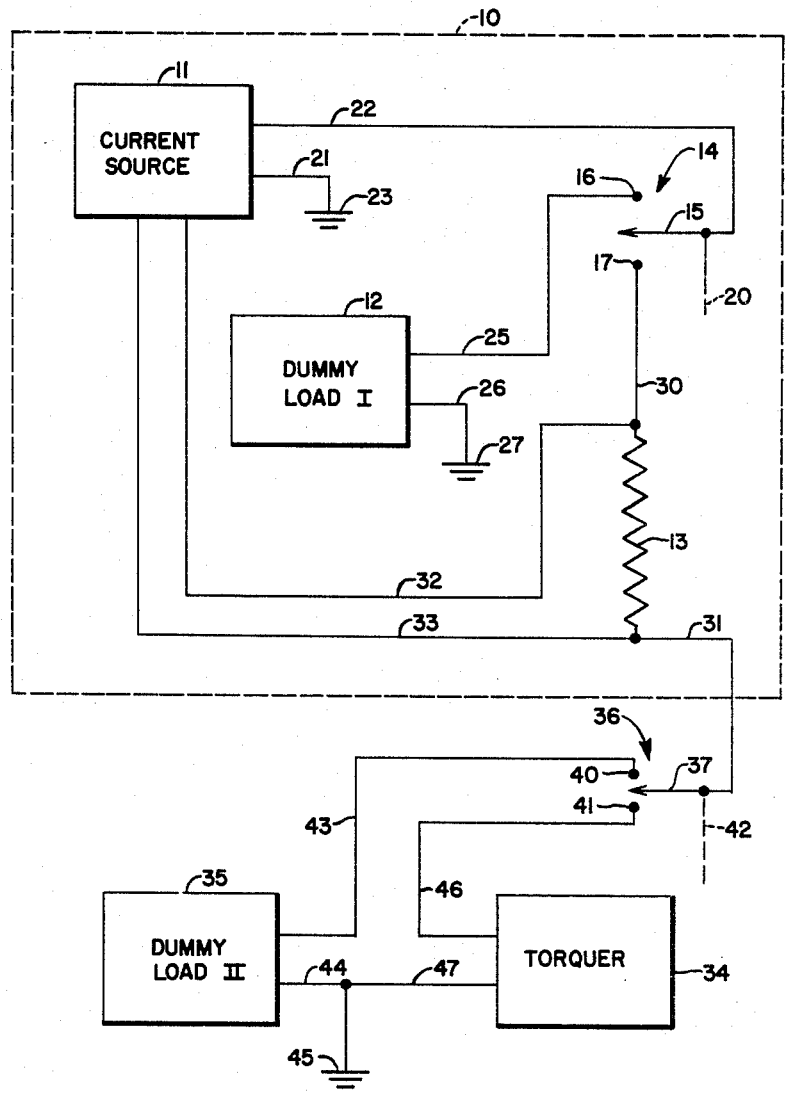

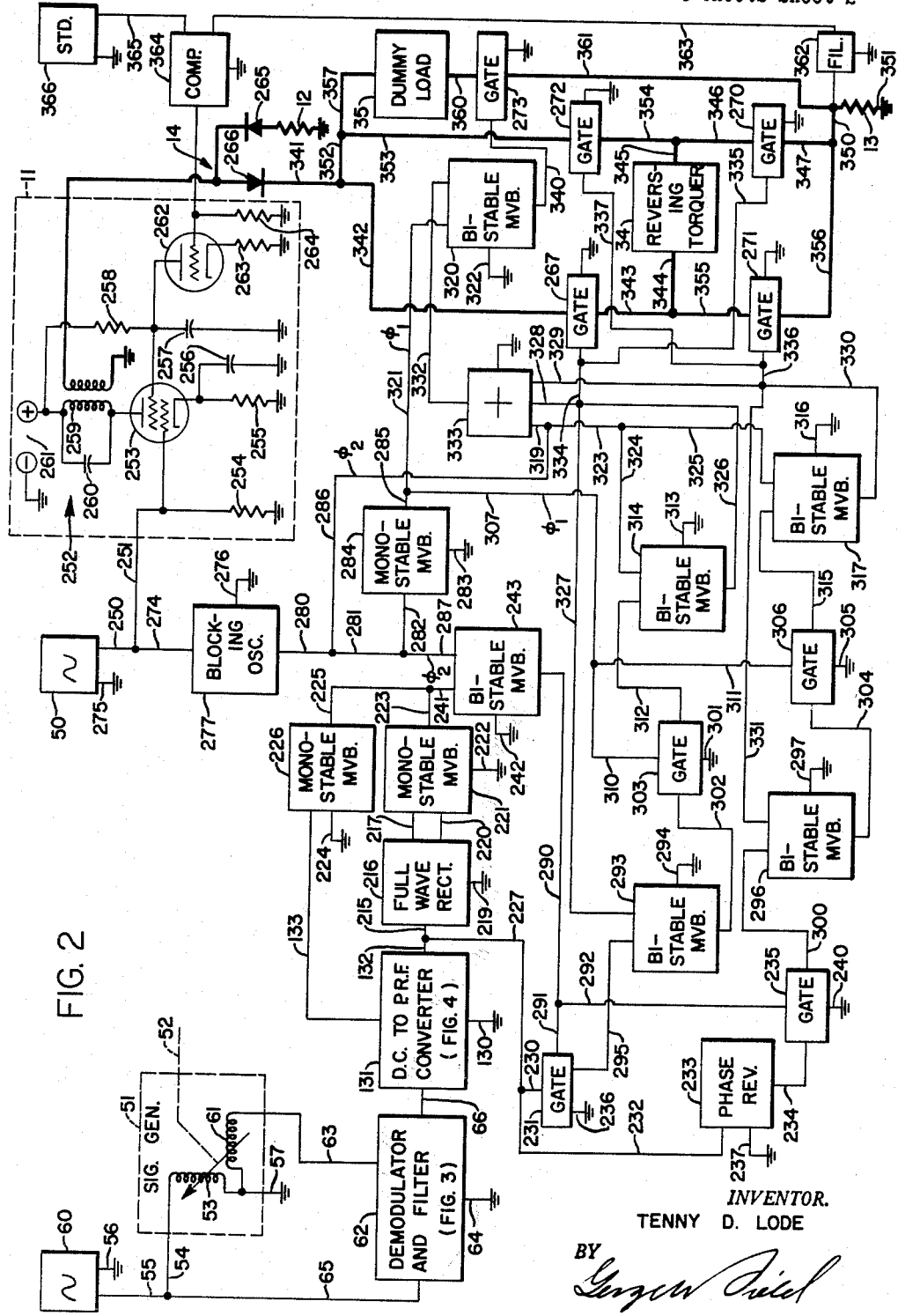

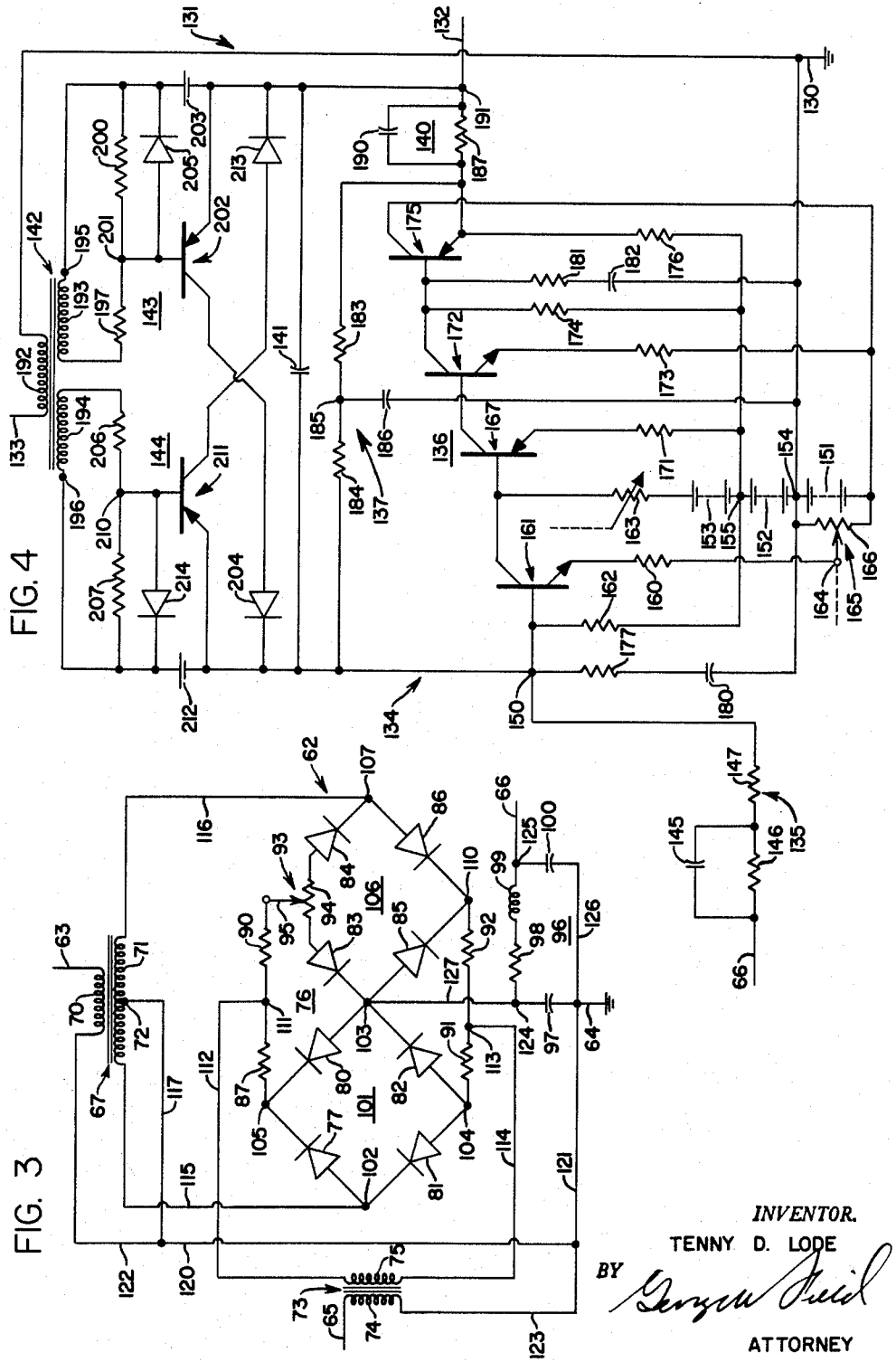

3,176,143
PULSE ENERGIZATION OF INERTIAL
DEVICES
Tenny D. Lode, Minneapolis, Minn., assignor to
Honeywell Inc., a corporation of Delaware
Filed Jan. 23, 1961, Ser. No. 84,449
7 Claims. (Cl. 307—38)

This invention relates specifically to the field of inertial devices, although it is of broader general applicability, being useful wherever it is desired to energize an energy consuming device pulsewise rather than continuously.

In inertial devices such as gyroscopes and accelerometers there are often provided torquers to controllably precess the gyroscopes or controllably rebalance the accelerometers. It is known to energize such torquers continuously at a level determined by some variable condition. This is particularly the case when the device is rigidly fixed to the airframe of an aircraft for example.

Recently it has become desirable to control the energization of such torquers from the output of digital computers, which outputs normally take the form of pulses. The present invention has for its principal object to provide means for satisfactorily pulse-torquing inertial devices, such means to be operated at the high pulse repetition rates required for useful accuracy of torquing in high performance aircraft. Subordinate objects are to provide means supplying a train of substantially constant energy pulses, and to provide means selectively supplying pulses from the source to operate a torquer in either direction, according as a control condition is deviated from, and to supply no pulse to the torquer as long as the condition is achieved, while maintaining a substantially constant load on the pulse source.

Various other objects, advantages, and features of novelty not individually enumerated above which characterize my invention are pointed out with particularity in the claims annexed hereto and forming a part hereof. However, for a better understanding of the invention, its advantages, and objects attained by its use reference should be had to the subjoined drawing, which forms a further part hereof, and to the accompanying descriptive matter, in which I have illustrated and described a preferred embodiment of my invention.

In the drawing, FIGURE 1 is a block diagram showing a rudimentary, non-reversing form of the invention;

FIGURE 2 is a schematic showing in somewhat more detail of a more refined embodiment of the invention;

FIGURES 3 and 4 are wiring diagrams of components of FIGURE 2; and

Structure of FIGURE 1

Figure 5:
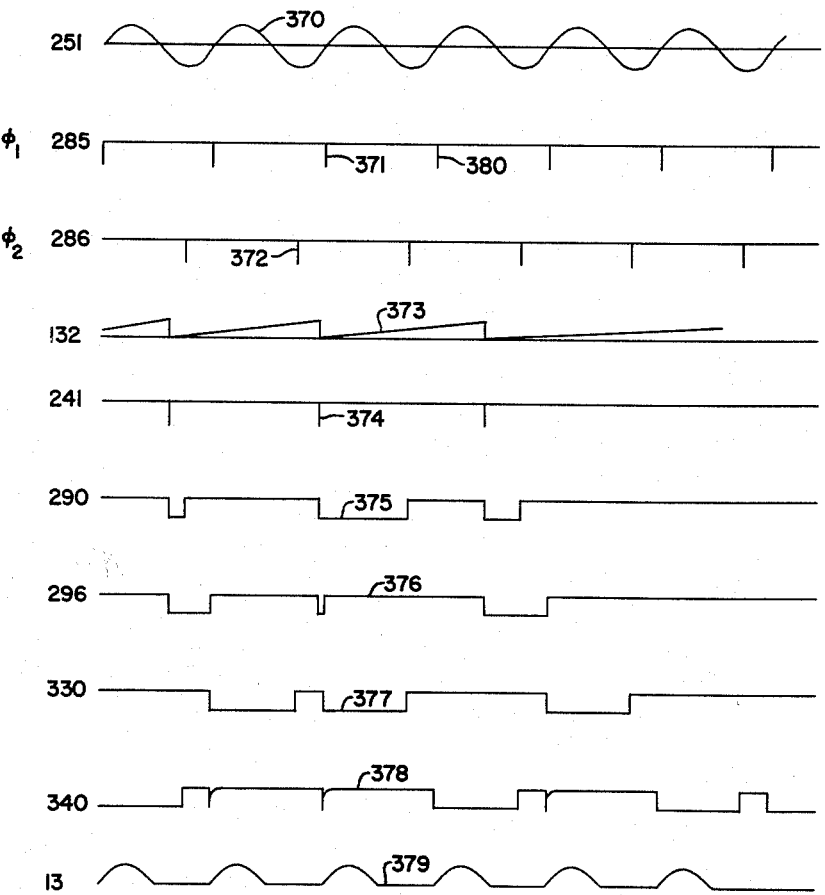
FIGURE 5 shows wave forms occurring in the structure of FIGURE 2.

FIGURE 1 shows a constant pulse source 10 comprising a current source 11, a first dummy load 12, measuring means in the form of a resistor 13, and a switch 14 having a movable contact 15 and a pair of fixed contacts 16 and 17. The broken line 20 is used to indicate conventional means for cyclically switching contact 15 between contacts 16 and 17 so that it never touches both contacts simultaneously, but is substantially always in engagement with one or the other. The output of source 11 appears on connecting leads 21 and 22, the former being grounded at 23 and the latter being connected to switch contact 15. When contacts 15 and 16 are in engagement the circuit is completed through conductor 25, dummy load 12, connecting lead 26, and ground connection 27. When contacts 15 and 17 are in engagement the circuit is completed through conecting lead 30, resistor 13, connecting lead 31, and an external circuit later to be described. The voltage drop across resistor 13 is transmitted to source 11 by connecting leads 32 and 33 as a corrective feedback, and is used to maintain the current supplied by source 11 at a desired level.

The system further includes the torquer to be energized, shown at 34, a second dummy load 35, and a second switch 36 having a movable contact 37 and a pair of fixed contacts 40 and 41. The broken line 42 is used to indicate conventional means causing operation of contact 37 out of a center, normally open condition, to engage one of contacts 40 and 41 according as a selected variable quantity is or is not equal to a predetermined value. When switch contacts 37 and 40 are in engagement a circuit from connecting lead 31 is completed through connecting lead 43, dummy load 35, and connecting lead 44 to ground 45. When switch contacts 37 and 41 are in engagement the circuit from connecting lead 31 is completed through connecting lead 46, torquer 34 and connecting lead 47 to ground 45.

Switches 14 and 36 are shown schematically and may comprise relays, vacuum tubes, diodes, transistors, or other suitable switching means.

It is important that switch 14 operate uniformly both as to frequency and as to dwell time.

Operation of FIGURE 1

The operation of the structure of FIGURE 1 is as follows. Current from source 11 is caused to flow first in dummy load 12 and then in resistor 13 in a repeating cycle. There is thus produced across resistor 13 a train of voltage pulses, and these are fed back to source 11 to adjust the output of the latter by any conventional means. Switch 36 is meanwhile being adjusted: if the variable quantity has the desired value, contacts 37 and 40 are in engagement, and each pulse of current through resistor 13 is passed to ground through dummy load 35: no effect is thus had on torquer 34. If the variable quantity deviates from the desired value switch 36 is operated to the condition in which contacts 37 and 41 are in engagement. The pulses of current through resistor 13 now pass through torquer 34, energizing it to return the condition to the desired value.

It must be appreciated that with the foregoing arrangement it is not necessary that the energy of each individual pulse be measured: it will be satisfactory to supply the signal on connecting leads 32 and 33 through a smoothing arrangement so that the corrective signal is in effect a moving average of the pulse energy contact.

It is possible to minimize the load on switch 36 by arranging it to break contact only during the interval during which switch 14 is interrupting the circuit from contact 15 to contact 17.

Structure of FIGURE 2

FIGURE 2 shows a preferred embodiment of my invention as actually constructed, except that the showing is simplified by the omission of a number of isolation amplifiers and by the use of blocks for conventional subcomponents such as gates, multivibrators, and oscillators. Current source 11, dummy loads 12 and 35, measuring resistor 13, and switch 14 are identified by the same reference numerals as in FIGURE 1, and equivalents for feedback leads 32 and 33 and switch 14 will be pointed out below.

The pulse repetition frequency for pulse torquing of inertial instruments is determined by the maximum expected angular input rate and the resolution, or angular increment per pulse, required to limit the errors generated in the computer handling the output data. In the embodiment of the invention about to be described a pulse repetition frequency of 62,500 p.p.s was used, corresponding to a resolution of less than .0028° per pulse for a maximum range of three radians per second. Element 50 in FIGURE 2 represents an oscillator having a frequency of 62.5 kilocycles per second, and determines the maximum number of pulses per second which can be supplied to torquer 34: the minimum number of pulses per second is of course zero. The instantaneous deviation of the intertial device from its normal position or acceleration determines the instantaneous pulse rate to the torquer, and this is accomplished by a signal generator 51 driven by suitable means 52 in accordance with the deviation. Signal generator 51 in the actual embodiment of the invention comprises an inductive device: its input winding 53 is energized through connecting leads 54 and 55 and ground connections 56 and 57 from a suitable source 60 of alternating voltage, and its output winding 61 is connected to a demodulator and filter 62 through connecting lead 63 and ground connections 57 and 64. Demodulator 62 is also energized through connecting leads 65 and 55 and ground connections 64 and 56 from source 60. An alternating output voltage appears between connecting lead 66 and ground which is zero when the signal generator is in a normal position, and which varies in magnitude and reverses in phase with variation in the amount and reversal in the sense of displacement of the signal generator from normal.

Component 62 is shown in FIGURE 3 to comprise a first transformer 67 having a primary winding 70 and a secondary winding 71 center tapped at 72, a second transformer 73 having a primary winding 74 and a secondary winding 75, a double ring demodulator network 76 including diodes 77, 80, 81, 82, 83, 84, 85, and 86, resistors 87, 90, 91, and 92, and a potentiometer 93 having resistance element 94 and an adjustable contact 95, and a filter 96 including capacitors 97 and 100, a resistor 98 and an inductor 99.

Diodes 77, 80, 81, and 82 are connected in the configuration of a bridge rectifier 101 having input terminals 102 and 103 and output terminals 104 and 105. Diodes 83, 84, 85 and 86 and winding 94 are connected in the configuration of a bridge rectifier 106 having input terminals 103 and 107: contact 95 comprises one output terminal of bridge 106, and the other output terminal is identified by the reference numeral 110. Resistors 87 and 90 are connected in series between terminal 105 and slider 95, and their junction point 111 is connected to one terminal of secondary winding 75 by a conductor 112. Resistors 91 and 92 are connected in series between terminals 104 and 110, and their junction point 113 is connected to the other terminal of secondary winding 75 by a conductor 114. Terminals 102 and 107 are connected to the ends of secondary winding 71 by conductors 115 and 116, and center tap 72 is grounded through conductors 117, 120 and 121 and ground connection 64. One end of primary winding 70 is connected to connecting lead 63, and the other end is grounded through conductors 122, 120, 121 and ground connection 64. One end of primary winding 74 is connected to connecting lead 65, and the other is grounded through conductors 123 and 121 and ground connection 64.

Capacitors 97 and 100, resistor 98 and inductor 99 are connected to form a pi network having an input terminal 124 and an output terminal 125, both with respect to ground, the circuit to ground connection 64 being completed by conductor 126. The output of network 76 appears between ground and terminal 103, which is connected by a conductor 127 to filter input terminal 124.

The output of component 62 is shown in FIGURE 2 as being supplied on connecting lead 66 and ground connections 64 and 130 to a converter 131 which functions to give a pulse output, between ground connection 130 and connecting lead 132, the repetition frequency of which varies with the magnitude of the input direct voltage. This is accomplished with the aid of a second input supplied between ground connection 130 and connecting lead 133.

FIGURE 4 gives more details as to the structure of converter 131. It includes an integrator 134 having an input network 135, a three-stage common emitter complementary direct coupled transistor amplifier 136, a negative feedback network 137, an isolation network 140, and a feedback capacitor 141, and an integrator resetting network including a transformer 142 and a pair of transistor gates 143 and 144.

Network 135 includes a pair of resistors 146 and 147 connected in series between connecting lead 66 and a summation point 150 and a capacitor 145 connected in parallel with resistor 146.

Amplifier 136 is energized from a voltage source shown as a plurality of batteries 151, 152 and 153 connected in series: 154 is the junction point between the batteries 151 and 152, and 155 is the junction point between batteries 152 and 153. Junction point 154 is connected to ground connection 130. The first amplifier stage includes an NPN transistor 161 having a base connection to summation point 150 and, through a resistor 162, to junction point 155, a collector connected to the positive terminal of battery 153 through a variable resistor 163, and an emitter connected through a resistor 160 to the movable contact 164 of a voltage divider 165 whose resistive element 166 is connected across battery 151. The second amplifier stage includes a PNP transistor 167 having a base connected to the collector of transistor 161, an emitter connected to junction point 155 through a resistor 171, and a collector connected to the base of an NPN transistor 172 included in the third amplifier stage: the emitter of transistor 172 is connected to the negative terminal of battery 151 through a resistor 173, and the collector is connected to junction point 155 through a resistor 174. The output of amplifier 136 is taken through an emitter follower stage including a PNP transistor 175 having a base connected to the collector of transistor 172, a collector connected to the negative terminal of battery 151, and an emitter connected to junction point 155 through a load resistor 176. For increased loop stability a resistor 177 and a capacitor 180 are connected in series between summation point 150 and junction point 154, and a second resistor 181 and capacitor 182 are connected in series from the base of transistor 175 to junction point 154.

Feedback network 137 provides D.C. stability and includes a pair of resistors 183 and 184 connected in series between summation point 150 and the emitter of transistor 175: the junction point 185 between the resistors is connected to ground through a capacitor 186.

Isolation network 140 includes an isolating resistor 187 and a bypass capacitor 190 connected in parallel between the emitter of transistor 175 and an output terminal 191.

Feedback capacitor 141 is connected between summation point 150 and output terminal 191, and cooperates with amplifier 136 and resistors 146 and 147 to comprise a feedback-amplifier RC-integrator of the well known type, the gain of amplifier 136 being sufficiently high for that purpose.

When an input direct voltage of some particular value is impressed between connecting lead 66 and ground, the apparatus just described functions within its limits, to provide between output terminal 191 and ground a linear ramp voltage the slope of which is determined by the magnitude of the input voltage. If the integrator is reset each time the ramp voltage reaches a predetermined value, the voltage at output terminal 191 becomes a sawtooth, the repetition rate of which is determined by the input voltage. There may thus be provided apparatus for converting direct voltage magnitude to pulse repetition frequency. The means for resetting the integrator shown in FIGURE 4 will now be described.

Transformer 142 has a primary winding 192 connected to connecting means 133 and to ground connection 130, and a pair of secondary windings 193 and 194 controlling gates 143 and 144 respectively. Connections to secondary windings 193 and 194 are so made that the voltages at terminals 195 and 196 respectively are of the same phase relative to the other terminals. Gate 143 includes a voltage divider made up of resistors 197 and 200 connected in series across secondary winding 193 and having a junction point 201. The base of a PNP transistor 202 is connected to junction point 201, the emitter is connected to terminal 195 through a battery 203, and to output terminal 191, and the collector is connected to summation point 150 through a protective diode 204; a further protective diode 205 is connected between junction point 201 and terminal 195. Gate 144 includes a voltage divider made up of resistors 206 and 207 connected in series across secondary winding 194 and having a junction point 210. The base of a PNP transistor 211 is to terminal 196, through a battery 212, and to summation point 150, and the collector is connected to output terminal 191 through a protective diode 213: a further protective diode 214 is connected between junction point 210 and terminal 196.

By reason of further apparatus about to be described, the pulses supplied to primary winding 192 are always of the same polarity: the voltage across capacitor 141 may be of either polarity, and determines which of transistors 202 and 211 will conduct to reset the integrator by short circuiting capacitor 141, to insure that regardless of the polarity of the charge of capacitor 141, resetting of the integrator can take place.

Returning now to FIGURE 2, the output of converter 131 is supplied through connecting leads 132 and 215 and ground connections 130 and 219 to a full-wave rectifier 216, when the ramp output of the converter, which may be of either polarity is converted to a ramp voltage always of the same polarity, and this is transmitted by connecting leads 217 and 220 to a monostable multivibrator 221. This multivibrator has a normal state in which it remains, as the ramp voltage increases, until a level is reached which is predetermined by the values of the components making up the multivibrator, and which in the preferred embodiment of the invention is approximately one volt. When this level is reached, the multivibrator changes briefly to its second state, remains so for a few microseconds, and then reverts to its former state, causing a short voltage pulse to appear between ground connection 222 and output connecting lead 223.

The pulse is transmitted through ground connections 222 and 224 and connecting leads 223 and 225 to a second monostable multivibrator 226, connecting lead 225 including any desirable isolation or impedance matching components. Multivibrator 226 essentially repeats the pulse from multivibrator 221 and supplies it between ground connection 224 and connecting lead 133.

From the above it will be apparent that the steeper the ramp voltage applied to multivibrator 221, the more quickly the predetermined value of one volt is reached, and hence the more times per second the integrator is reset. The pulse repetition frequency of the output of multivibrator 221 is thus varied in accordance with direct voltage from demodulator 62.

The polarity reversing ramp voltage output from converter 131 is also supplied on connecting leads 132, 227 and 230 to a gate 231, and on connecting leads 132, 227 and 232, a polarity reversing amplifier 233 and connecting lead 234 to a gate 235, the circuits being completed through ground connections 130, 236, 237, and 240. The output of multivibrator 221 is supplied through connecting leads 223 and 241 and ground connections 222 and 242 to comprise a first input to a bistable multivibrator 243, for the purpose of controlling the flow of electrical energy to torquer 34 or dummy load 35 in the form of pulses recurring at a repetition rate determined by the frequency of oscillator 50.

The output of oscillator 50 is supplied through connecting means 250 and 251 to control a power amplifier 252 including a power tetrode 253 having a grid resistor 254, a bias resistor 255, a cathode bypass capacitor 256, a screen grid bypass capacitor 257, a screen dropping resistor 258, an output transformer 259 having a tuning capacitor 260, a voltage source 261, and a regulating triode 262 connected between the screen grid of tetrode 253 and ground and having a cathode resistor 263 and a grid resistor 264. The negative halves of the sine wave output from amplifier 252 are transmitted by a rectifier 265 to dummy load 12. The positive half cycles are transmitted by a second rectifier 266. Rectifiers 265 and 266 together act as switch 14 of FIGURE 1.

The flow of pulse energy to torquer 34 is controlled by negative power gates 267 and 270 and positive power gates 271 and 272, and the flow of pulse energy to dummy load 35 is controlled by a power gate 273. Operation of these gates, which together perform the functions of switch 36 of FIGURE 1, is triggered upon coincidence between pulses controlled by oscillator 50 and impulses from multivibrator 243. To accomplish this the output of oscillator 50 is supplied through connecting leads 250 and 274 and ground connections 275 and 276 to control a blocking oscillator 277, which supplies between an output connecting lead 280 and ground a train of short pulses having a repetition frequency of 62,500 p.p.s. This train of pulses is supplied through connecting leads 281 and 282 and ground connections 276 and 283 to a monostable multivibrator 284, which repeats the pulses, between ground and an output connecting lead 285, with a predetermined delay of about a quarter of a cycle of oscillator 50, that is, about four microseconds. For convenience the pulse train from multivibrator 284 will be defined as the $\phi_1$ pulse train, while the pulse train from blocking oscillator 277 appearing on conductor 286 will be defined as the $\phi_2$ pulse train. The $\phi_2$ pulse train is also transmitted through conductors 280, 281, and 287 to comprise a second input to bistable multivibrator 243.

Multivibrator 243 is turned "on" by a signal from multivibrator 221, and is turned "off" by the next succeeding pulse in the $\phi_2$ train. During the time that it is "on" an output appears between connecting lead 290 and ground, and is transmitted to gates 231 and 235 by connecting leads 291 and 292 respectively. If during this time converter 131 is supplying a negative output, gate 231 is open and the output of multivibrator 243 is transmitted to provide a first input to a bistable multivibrator 293 through ground connections 242 and 294 and connecting lead 295. If converter 131 is supplying a positive output, gate 235 is open and the output of multivibrator 243 is transmitted to provide a first output to a bistable multivibrator 296 through ground connections 242 and 297 and connecting lead 300.

While multivibrator 293 is "on" it acts through ground connections 294 and 301 and connecting leads 302 to open the gate 303, and while multivibrator 296 is "on" it acts through ground connections 305 and 297 and connecting lead 304 to open the gate 306. The $\phi_1$ pulses on conductor 285 are supplied to gate 303 through connecting means 307 and 310, and to gate 306 through connecting means 307 and 311. If gate 303 is open, the $\phi_1$ pulse is transmitted and acts through connecting means 312 and ground connections 313 and 283 to turn on a bistable multivibrator 314, while if gate 306 is open the $\phi_1$ pulse is transmitted and acts through conducting means 315 and ground connections 316 and 283 to turn on the bistable multivibrator 317. Each $\phi_1$ pulse also turns on a further bistable multivibrator 320 through connecting lead 321 and ground connections 322 and 283.

The $\phi_2$ pulse appearing on conductor 286 is supplied through connection leads 323 and 324 to turn multivibrator 314 "off" if it is "on" and through connecting means 323 and 325 to turn multivibrator 317 "off" if it is "on." The output from multivibrator 314 is supplied on conductors 326 and 327 to turn "off" multivibrator 293, and the output from multivibrator 317 is supplied on conductors 330 and 331 to turn "off" multivibrator 296. Multivibrator 320 is turned "off" by the output 332 of an adder 333 connected to receive as inputs 328, 329, and 319, the outputs of multivibrators 314 and 317 and the $\phi_2$ pulses, respectively. The multivibrator is turned "off" by the $\phi_2$ pulse if there has been no operation of either multivibrator 314 or multivibrator 317.

The output of multivibrator 314 also acts through connecting means 326, 334 and 335 to open gates 267 and 270, and the output of multivibrator 317 acts through connecting means 330, 336 and 337 to open gates 271 and 272. These pairs of gates are thus opened alternatively, and never at the same time. Similarly, the operation of multivibrator 320 acts through connecting means 340 to open gate 273 whenever there is no operation of either pair of the other gates. Thus there are three possible paths for the half-wave pulses transmitted through rectifier 266. The first path includes conducting leads 341 and 342, gate 267, conducting leads 343 and 344, torquer 34, conducting leads 345 and 346, gate 270, conducting leads 347 and 350, measuring resistance 13, and ground connection 351. The second path includes conducting leads 341, 352 and 353, gate 272, conducting leads 354 and 345, torquer 34, conducting leads 344 and 355, gate 271, conducting leads 356 and 350, measuring resistance 13 and ground connection 351. The third path includes conducting leads 341, 352 and 357, dummy load 35, conducting lead 360, gate 273, conducting lead 361, measuring resistance 13, and ground 351.

In one embodiment of the invention the following values were found satisfactory for components shown in FIGURES 2, 3, and 4.

| Component | | Ohms |
|---|---|---|
| Resistor 12 | | 46 |
| Resistor 13 | | 10 |
| Resistor 87 | | 20,000 |
| Resistor 90 | | 20,000 |
| Resistor 91 | | 20,000 |
| Resistor 92 | | 20,000 |
| Resistor 94 | | 1,000 |
| Resistor 101 | | 2,000 |
| Resistor 102 | | 47,000 |
| Resistor 110 | | 4,700 |
| Resistor 146 | | 33,000 |
| Resistor 147 | | 10,000 |
| Resistor 160 | | 100 |
| Resistor 162 | | 330,000 |
| Resistor 163 | | 6,000 |
| Resistor 166 | | 460 |
| Resistor 171 | | 150 |
| Resistor 173 | | 15 |
| Resistor 174 | | 510 |
| Resistor 176 | | 510 |
| Resistor 177 | | 150 |
| Resistor 181 | | 100 |
| Resistor 183 | | 5,100 |
| Resistor 184 | | 270,000 |
| Resistor 187 | | 330 |
| Resistor 197 | | 270 |
| Resistor 200 | | 820 |
| Resistor 206 | | 270 |
| Resistor 207 | | 820 |
| Resistor 254 | | 16,000 |
| Resistor 255 | | 220 |
| Resistor 258 | | 30,000 |
| Resistor 263 | | 200 |
| Resistor 264 | | 270,000 |
| Dummy resistor 35 (at 62,500 c.p.s.) | | 80+j119 |
| Capacitor 97 | microfarads | .001 |
| Capacitor 100 | do | .06 |
| Capacitor 145 | do | .25 |
| Capacitor 180 | micro-microfarads | 500 |
| Capacitor 182 | microfarads | .003 |
| Capacitor 186 | do | 20 |
| Capacitor 190 | micro-microfarads | 470 |
| Capacitor 256 | do | .1 |
| Capacitor 257 | do | .01 |
| Capacitor 260 | do | .003 |
| Transistor 161 | | 2N336 |
| Transistor 167 | | 2N450 |
| Transistor 172 | | 2N167 |
| Transistor 175 | | 2N450 |
| Transistor 202 | | 2N450 |
| Transistor 211 | | 2N450 |
| Tube 253 | | 2E26 |
| Tube 262 | | [1] 6AQ5 |
| Diode 77 | | HD6008 |
| Diode 80 | | HD6008 |
| Diode 81 | | HD6008 |
| Diode 82 | | HD6008 |
| Diode 83 | | HD6008 |
| Diode 84 | | HD6008 |
| Diode 85 | | HD6008 |
| Diode 86 | | HD6008 |
| Diode 204 | | 1N305 |
| Diode 205 | | 1N305 |
| Diode 213 | | 1N305 |
| Diode 214 | | 1N305 |

| Component | Volts |
|---|---|
| Battery 151 | 6 |
| Battery 152 | 6 |
| Battery 153 | 7 |
| Battery 203 | 1.3 |
| Battery 212 | 1.3 |
| Source 261 | 500 |

[1] Triode connected.

In brief review, whenever the output of converter 131 is of a negative polarity gate 231 is open, acting through multivibrator 293, gate 303, and multivibrator 314 to open gates 267 and 270, allowing pulse energy to pass through torquer 34 from left to right. Whenever the output of converter 131 is of positive polarity gate 235 is open acting through multivibrator 296, gate 306, and multivibrator 317 to open gates 271 and 272, allowing pulse energy to pass through torquer 134 from right to left. Whenever there is no output from converter 131 multivibrator 320 opens gate 273 to allow pulse energy to pass through dummy load 35. It will be noted that for all half-wave pulses from rectifier 266 there are paths to ground through measuring resistance 13, and that these paths are all of the same impedance.

A filter 362 is connected across resistor 13, and supplies on connecting means 363 a unidirectional voltage which is continuously representative of the average power contained in the pulses from rectifier 266. This voltage is combined in a comparator 364 with a standard voltage supplied on connecting means 365 from a standard source 366, and the difference is supplied to the grid of triode 262, varying the impedance of the latter and thus the screen grid voltage on tetrode 253, in a manner to maintain the average power constant. Elements 362 to 366 perform the function of conductors 32 and 33 of FIGURE 1.

*Operation of FIGURES 2, 3 and 4*

The operation of the structure illustrated in FIGURE 2 will now be described, appropriate references being made to the wave forms shown in FIGURE 5. Oscillators 50 and 60 are energized, together with any isolation amplifiers, etc., which may be supplied. Signal generator 51 is initially adjusted so that when the inertial device is in its normal position, for example, no output is supplied to demodulator 62, and movable contact 95 is then adjusted so that demodulator 62 supplies no output. Components 163 and 165 of FIGURE 4 are adjusted so that junction point 150 is at ground potential. The various batteries, voltage standard 366, and source 261 are connected, and the system is in normal operation. Under these conditions no signal is supplied to gates 231 and 235, of FIGURE 2, and no input turns multivibrator 243 on. Oscillator 50 triggers blocking oscillator 277 to supply the $\phi_1$ and $\phi_2$ pulse trains, and energizes power amplifier 252 to supply half-wave pulses of energy through rectifier 266. The $\phi_1$ pulses coincide with the beginning of the positive going half-cycles of oscillator 50, and each $\phi_1$ pulse turns on multivibrator 320 to open gate 273. Multivibrator 320 is shut off when gate 273 is closed by each $\phi_2$ pulse. It is evident that the gate is opened to transmit the rectifier pulses through dummy load 35 and measuring resistor 13. The train of voltage pulses across resistor 13 is smoothed and compared with the standard voltage from source 366. If the voltages are not the same, comparator 364 supplies an output to vary the grid voltage of triode 262 and therefore the screen voltage of tetrode 253.

Now consider the case where the inertial device has departed from zero position, but is returning thereto. This is illustrated by the wave forms in FIGURE 5, the deviation being assumed to be such a sense that the output of demodulator 62 is positive.

Curve 370 shows the output of oscillator 50. Curve 371 shows the output of multivibrator 284, the $\phi_1$ pulse train, and curve 372 shows the output of blocking oscillator 277, the $\phi_2$ pulse train. Curve 373 shows the ramp voltage supplied by converter 131. It will be noted that the slopes of successive ramps are becoming flatter and their lengths are increasing, although they all rise to the predetermined level. Curve 374 represents the pulses from multivibrator 221, after having passed through suitable peaking and clipping circuitry. It shows that a negative pulse occurs each time the ramp voltage reaches the predetermined value. Curve 375 shows the output of multivibrator 243. It is turned "on" by the pulses of curve 374 and "off" by the $\phi_2$ pulses, so that the pulses of curve 375 are of variable length. Curve 376 shows the output of multivibrator 296. It is turned "on" when multivibrator 243 turns on, and is turned "off" by operation of multivibrator 317 in response to the $\phi_1$ pulses, so that the pulses of curve 376 are also of variable length. Curve 377 shows the output of multivibrator 317. It is turned "on" by a $\phi_1$ pulse and "off" by the next $\phi_2$ pulse so that the pulses of conductor 377 are all of the same length, and all phased to encompass in point of time the positive half-waves from rectifier 266, shown in curve 379. Note that a $\phi_1$ pulse can turn "on" multivibrator 317 only if at the time multivibrator 296 is already "on." Thus the $\phi_1$ pulse identified by reference numeral 380 in curve 371 does not turn "on" multivibrator 317. Curve 378 shows the output of multivibrator 320. It is turned "on" by the $\phi_1$ pulses, but is immediately turned "off" again by operation of multivibrator 317. However, when multivibrator 317 does not operate, multivibrator 320 stays turned "on" until the next $\phi_2$ pulse turns it "off."

It will be apparent that the flatter the slope of the integrator ramp, the more pulse intervals there are during which no pulse appears from multivibrator 221. This means that a smaller proportion of the half-wave pulses of energy pass through torquer 34 and a greater proportion of them pass through dummy load 35 thus reducing the energization of torquer 34. Nevertheless each half-wave pulse is conducted in its entirety through one load or the other, and the load on rectifier 266 is thus held constant.

If it had been assumed that the inertial device were displaced in the opposite sense, the ramps of curve 373 would have been negative instead of positive. Then curves 376 and 377 would represent multivibrators 293 and 314 respectively.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principle of the invention, to the full extent indicated by the broad general meaning of the terms in which the appended claims are expressed.

I claim as my invention:

1. In combination: means supplying a continuous train of spaced energy pulses; a load device to be energized with pulses from said source; auxiliary pulse receiving means having the same electrical characteristics as the load device; condition responsive switching means normally supplying said pulses to said auxiliary means, and operable to divert pulses to said load device when a variable condition departs from a predetermined value; and means causing operation of said switching means to take place substantially during an interpulse interval of said train.

2. In combination: adjustable means supplying a continuous train of current pulses; a load device to be energized with pulses from said source; a dummy load having substantially the same impedance as said load device; condition responsive means supplying pulses to said load device from said train in proportion to a variable condition, and supplying the remainder of said pulses to said dummy load; and means adjusting said adjustable means in response to the average energy of the pulses energizing said load device and said dummy load to maintain substantially uniform energy content in said pulses.

3. In combination: adjustable means supplying a continuous train of current pulses; a load device to be energized with pulses from said adjustable means; a dummy load having substantially the same impedance as said device; means normally transmitting said pulses to said dummy load; condition responsive means connected to said adjustable means, said load device, and said dummy load for diverting to said load device a portion of the total number of pulses which varies with variation in a condition; and means connected to said adjustable means, said load device, and said dummy load, for continuously adjusting said adjustable means in accordance with the average energy of said pulses so as to maintain substantially uniform energy content therein.

4. In combination: an inertial device; means for applying torque about an axis of said device in accordance with energy pulses supplied thereto; means supplying a continuous train of energy pulses; auxiliary pulse receiving means having the same electrical characteristics as the first named means; means normally supplying said pulses to said auxiliary means; and means diverting pulses from said auxiliary means to said first named means in accordance with the variable condition.

5. In combination: adjustable means supplying a continuous train of energy pulses; measuring means connected to receive said pulses for continuously giving an output determined by the average pulse energy content; and means connected to said adjustable means and said measuring means for adjusting said adjustable means in accordance with said output so as to maintain substantially constant energy content in said pulses.

6. In combination: a current source; first and second switching means each having first and second operating conditions; first and second dummy loads; a measuring element; a load device; means effective in the first condition of said first switching means to connect said source to said first dummy load, and in the second condition of said first switching means to connect said source to second switching means; means effective in the first condition of said second switching means to connect said second dummy load to said measuring element, and in the second condition of said second switching means to connect said load device to said measuring element; means causing cyclic operation of said first switching means between said first and said second conditions; control means connected to said second switching means for determining the condition thereof according as a variable quantity has or departs from a predetermined value; and means connected to prevent said second control means from changing the condition of said second switching means except when said first switching means is in said second condition.

7. In combination: an adjustable current source; first and second switching means each having first and second operating conditions; first and second dummy loads; a measuring element; a load device; means effective in the first condition of said first switching means to connect said source to said first dummy load, and in the second condition of said first switching means to connect said source to second switching means; means effective in the first condition of said second switching means to connect said second dummy load to said measuring element, and in the second condition of said second switching means to connect said load device to said measuring element; means causing cyclic operation of said first switching means between said first and said second conditions; control means connected to said second switching means for determining the condition thereof according as a variable quantity has or departs from a predetermined value; and means connected to prevent said second control means from changing the condition of said second switching means except when said first switching means is in said second condition; and means connected to said source and including said measuring element for adjusting said source to maintain the pulse energy content uniform.

References Cited by the Examiner
UNITED STATES PATENTS

| | | | |
|---|---|---|---|
| 2,345,149 | 3/44 | Purifoy | 307—38 |
| 2,496,199 | 1/50 | Bushway | 307—39 X |
| 2,916,279 | 12/59 | Stanton | 244—14 X |
| 2,937,327 | 5/60 | Vossberg | 318—443 |
| 3,046,409 | 7/62 | Patnaude | 307—39 |

ORIS L. RADER, *Primary Examiner.*
CHESTER L. JUSTUS, KATHLEEN H. CLAFFY,
*Examiners.*